(12) United States Patent
Yoshioka

(10) Patent No.: US 8,943,439 B2
(45) Date of Patent: Jan. 27, 2015

(54) SYSTEM AND METHOD FOR ORGANIZING APPLICATION PROGRAMS AND STATUS INFORMATION

(75) Inventor: Akio Yoshioka, Saitama (JP)

(73) Assignee: Access Co., Ltd., Tokyo (JP)

( * ) Notice: Subject to any disclaimer, the term of this patent is extended or adjusted under 35 U.S.C. 154(b) by 1359 days.

(21) Appl. No.: 11/992,884

(22) PCT Filed: Sep. 27, 2006

(86) PCT No.: PCT/JP2006/319161
§ 371 (c)(1),
(2), (4) Date: Sep. 11, 2009

(87) PCT Pub. No.: WO2007/037264
PCT Pub. Date: Apr. 5, 2007

(65) Prior Publication Data
US 2010/0005421 A1    Jan. 7, 2010

(30) Foreign Application Priority Data

Sep. 28, 2005   (JP) ................................. 2005-281333
Sep. 30, 2005   (JP) ................................. 2005-288163

(51) Int. Cl.
*G06F 3/048* (2013.01)
(52) U.S. Cl.
USPC ........... 715/823; 715/711; 715/772; 715/835; 715/838
(58) Field of Classification Search
CPC ... G06F 8/38; G06F 17/30058; G11B 19/025; G06Q 30/0267; G06Q 10/10
USPC .......................... 715/711, 772, 823, 835, 838
See application file for complete search history.

(56) References Cited

U.S. PATENT DOCUMENTS

| 5,581,685 A | 12/1996 | Sakurai et al. |
| 2003/0011647 A1 | 1/2003 | Abbondanzio et al. |
| 2005/0022127 A1* | 1/2005 | Meyers et al. ................ 715/716 |
| 2005/0076308 A1 | 4/2005 | Mansell et al. |
| 2005/0096812 A1 | 5/2005 | Nezu et al. |
| 2006/0098945 A1* | 5/2006 | Kim ................................. 386/98 |
| 2008/0100591 A1 | 5/2008 | Nezu et al. |

FOREIGN PATENT DOCUMENTS

| JP | 07-261969 | 10/1995 |
| JP | 10-177476 | 6/1998 |

(Continued)

OTHER PUBLICATIONS

International Search Report mailed Dec. 19, 2006, for PCT Application No. PCT/JP2006/319161 filed Sep. 27, 2006, 4 pages.
Supplementary European Search Report of Application No. EP 06 79 8368, dated Jul. 6, 2010. (3 pages).
Office Action received for Japanese Patent Application No. 2007-537638, mailed on Feb. 28, 2012, 7 pages (3 pages of English Translation and 4 pages of Office Action).

(Continued)

*Primary Examiner* — Namitha Pillai
(74) *Attorney, Agent, or Firm* — Baker & Hostetler LLP

(57) ABSTRACT

A terminal device includes a display unit having a function for displaying a menu screen on a display screen, a selection unit for causing a user to select one of the items in the menus screen displayed on the display screen, and a holding unit holding status information concerning at least one application among a plurality of applications. The display unit displays an item indicating the application on the display screen while presenting status information on the application held in the holding unit on the display screen.

8 Claims, 12 Drawing Sheets

(56) References Cited

FOREIGN PATENT DOCUMENTS

Figure 1:
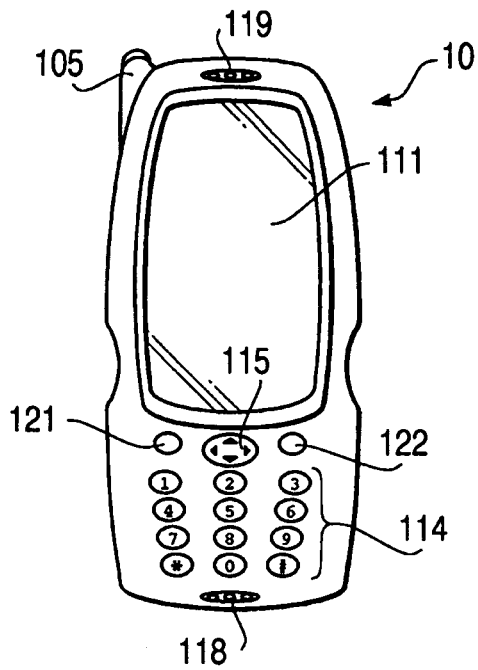

| | | |
|---|---|---|
| JP | 10-187576 | 7/1998 |
| JP | 2003-029931 | 1/2003 |
| JP | 2004-178363 | 6/2004 |
| JP | 2005-96596 A | 4/2005 |
| JP | 2005-098831 | 4/2005 |
| WO | 2005/055034 A1 | 6/2005 |

OTHER PUBLICATIONS

Extended European Search Report received for European Patent Application No. 12004383.1, mailed on Oct. 5, 2012, 7 pages.
Office Action received for Japanese Patent Application No. 2012-093723 mailed on Feb. 25, 2013, 4 pages (2 pages of English Translation and 2 pages of Office Action).

* cited by examiner

SYSTEM AND METHOD FOR ORGANIZING APPLICATION PROGRAMS AND STATUS INFORMATION

FIELD OF THE INVENTION

The present invention relates to a terminal device having a displaying screen, specifically to a terminal device and a program having a function to display a menu to select application software on a displaying screen.

BACKGROUND OF THE ART

In recent years, a plurality of application programs such as a mailer, a browser, a folder administration tool, and a media player application, for example, are installed in devices such as a PC, a terminal device, and a TV.

Such a terminal device with a plurality of application programs is, in general, provided with a menu window to select an application. A user is thus allowed to select an application from the menu window. Further, in some terminal devices, the menu windows are configured in a hierarchical structure so that each menu window is displayed on the screen on an application basis. When the menu windows are configured in such a hierarchical structure, the user can select an application through key operations and the like to trace down the hierarchy. Thus, the hierarchical structure of the menu windows can be considered to be more user-friendly in the terminal device having a number of application programs.

Upon selection of an application, a user operates an input unit being equipped to the terminal device. Generally, the terminal device is provided with an input unit including a mouse, a keyboard, direction keys, and a touch panel. Certain terminal devices are provided with two or more, or all, of those so that operations to select an application can be inputted through one of those as the input unit.

For example, menu items in a terminal device disclosed in Japanese Patent Provisional Publication No. 2004-178363 (see, for example, FIGS. 3 and 4) is configured in a hierarchy so that a user can easily provide an instruction to activate and display an application program in a lower layer, which belongs to an item in an upper layer. (For example, an application program such as "web browse" and an "E-mail" which are in lower layers can be activated to be displayed when an application program "custom menu" in an upper layer is selected.) In other words, the application program in a lower layer can be activated and displayed without an operation to track down the hierarchical layers.

For another example, in an information processing apparatus disclosed in Japanese Patent Provisional Publication No. 2003-29931, a list of programs including names and description of the programs is displayed as an operation to track down the hierarchy is performed so that the usability for the user to select a program is improved.

Further, for example, in Japanese Patent Provisional Publication No. 2005-98831, an in-car device capable of receiving an operation to select a menu in a hierarchy, which is given through a touch panel and a remote controller, is disclosed.

In the in-car device, a menu in an upper layer representing menu items in a hierarchical structure is displayed along with a menu in a lower layer corresponding to a selection among the menu items in the upper layer. During an operation through the touch panel, an operation to select either one of the menus in the upper layer and the accompanying lower layer, which are concurrently displayed, can be entered. Thus, according to the selection of the menu item in the upper layer, a menu corresponding to the selected menu item in the upper layer is displayed. Meanwhile, during an operation using the remote controller, a focused display is switched from the menu in the lower layer to the menu in the upper layer. Thereafter, the focus is switched within the menu in the upper layer. Further, the menu in the lower layer being displayed is switched to the menu corresponding to the menu item being focused in the upper layer. Each of the menus represents operations for, for example, play, pause, and switch display, which concern processing of the contents. In the in-car device, the menu windows to be operated through the touch panel operation and the remote controller operation are in an identical configuration.

Additionally, the device disclosed in the above-referenced publication No. 2005-98831 is provided with a function to display different menus depending on the input unit being used.

That is, a program menu, in which the user selects an application, is installed in the in-car device, and the program menu represents, for example, a TV menu for receiving a telecast, a video menu for playing video contents recorded in a hard disk drive, an audio menu for playing audio contents recorded in the hard disk drive, and a web menu for activating an internet browser. In the in-car device, display of the program menu adapted for the touch panel operation and display of the program menu adapted for the remote controller operation are in different configurations. The displaying methods of the program menu are switched according to the operations, which are given through the touch panel and the remote controller so that usability can be improved.

DISCLOSURE OF THE INVENTION

Problems to be Solved by the Invention

In the terminal device having a plurality of application programs installed, a configuration, in which a list of the programs includes names and description of the programs to be displayed, can improve usability for the user to select an application program (e.g., the terminal device disclosed in Japanese Patent Provisional Publication No. 2003-29931).

In the terminal device having a plurality of application programs installed, there can be a situation in which an application program is activated while another application is inactivated. Moreover, there can be a situation in which an application program is activated in background, but circumstance of the application program is not displayed on the display screen. Furthermore, for example, concerning a plurality of application programs being inactivated, the user may not necessarily memorize what operation was being executed in each application program. However, when the user selects one desired application program among a plurality of application programs, the user may often wish to consider current or past status of the application program. Therefore, a configuration in which the latest status of the application program is displayed along with the list of the application programs can improve usability for the user to select the application program.

Moreover, in the terminal device having a plurality of application programs installed, usability for the user to select an application program can be improved when the menu to select is configured in the hierarchical structure (e.g., the terminal device disclosed in Japanese Patent Provisional Publication No. 2004-178363).

Furthermore, in the terminal device having a plurality of input units, user operability can be improved when the menu is adapted to be in an optimized display method for each input unit (e.g., the in-car device disclosed in Japanese Patent Provisional Publication No. 2005-98831).

For example, in the information processing apparatus disclosed in Japanese Patent Provisional Publication No. 2003-29931, terms and names to describe the application programs are displayed. However, such description is fixed and invariant, and the user is not capable of knowing the current or past status of the application program based on the menu display. Therefore, the user is urged to activate the application program in order to recognize the status.

Accordingly, in the conventional devices described above, the user has been urged to conduct an operation, which can be inconvenient, for activating or displaying the individual application program to select one of the plurality of application programs.

In the terminal device disclosed in Japanese Patent Provisional Publication No. 2004-178363, the menu items in the upper layer and the accompanying lower layer are concurrently displayed. Therefore, the user is allowed to instruct activation and display of the application program in the lower layer without tracking down the hierarchy once the menu item in the upper layer is selected. However, the menu to select the application program does not display the current status or the latest status of the application program. Accordingly, the user has been urged to activate or select the application program for display.

Furthermore, the conventional terminal device, in which an application program to be activated is selected among the menu in the hierarchy, has not been provided with a function to optimize the display method to display the hierarchical menu for the individual input unit. In other words, in Japanese Patent Provisional Publication 2005-98831, the menu of the contents is configured in a hierarchical structure, although the hierarchical structure is not variable according to the input units.

Although, in Japanese Patent Provisional Publication 2005-98831, different program menus are provided for individual input units, the menu is not hierarchical. In addition, the program menu does not vary unless a specific operation is given.

Therefore, conventionally, no terminal device capable of displaying menus which are in a hierarchical structure and vary according to the input units has been found.

In view of the above problems, the present invention aims to provide a terminal device, having a plurality of application programs and/or a plurality of input units, in which usability for a user to select a menu item is improved and a program therefor.

Means to Solve the Problems

In order to achieve the objective, an aspect of the present invention provides a terminal device, having a display screen, a display unit having a function to display a menu window on the display screen, the menu window containing items, each of which represents one of a plurality of application programs, and in which selection of at least one application program among the plurality of application programs is made, a selection unit to prompt a user to select any of the items in the menu window being displayed on the display screen, and a container unit to contain status information concerning at least one of the plurality of application programs. The display unit displays the items respectively representing the plurality of application items along with the status information concerning the application programs contained in the container unit on the display screen.

Further, according to an aspect of the present invention, there is provided a program, having a step to display a menu window on a display screen of a terminal device, the menu window containing items, each of which represents one of a plurality of application programs, and in which selection of at least one application program among the plurality of application programs is made, a step to prompt a user to select any of the items in the menu window being displayed on the display screen, a step to contain status information concerning at least one of the plurality of application programs, and a step to display the items respectively representing the plurality of application items along with the status information concerning the application programs contained within the containing step on the display screen.

With the terminal device and a program configured as above, the various status information concerning the application programs can be displayed along with a list in which an application program can be selected, Therefore, the status information which helps selection-making for an application program can be obtained so that usability in selecting an application program can be improved.

According to another aspect of the present invention, there if provided a terminal device, including a display screen, a plurality of input units, a section to contain menu specific data, which is used to configure variant menus respectively for the plurality of input units, a unit to contain menu common data, which is common in the variant menus and independent from the input units, a section to store information concerning operational status to be associated with the menu common data each time the operation to input through the input unit is provided, a unit to generate a menu window to display on the display screen according to an input unit currently being used based on the menu specific data, the menu common data, and the information concerning operational status, a section to judge as to whether the input units were switched based on an operation provided through any of the plurality of input units, and a section to switch to a menu corresponding to the input unit when it is judged that the input units were switched.

According to still another aspect of the present invention, there is provided a program to have a terminal device to execute a step to contain menu specific data, which is used to configure variant menus respectively for a plurality of input units, a step to contain menu common data, which is common in the variant menus and independent from the input units, a step to store information concerning operational status to be associated with the menu common data each time the operation to input through the input unit is provided, a step to generate a menu window to display on a display screen of the terminal device according to an input unit currently being used based on the menu specific data, the menu common data, and the information concerning operational status, a step to judge as to whether the input units were switched based on an operation provided through any of the plurality of input units, and a step to switch to a menu corresponding to the input unit when it is judged that the input units were switched.

With the terminal device and a program configured as above, the menu specific data, which configures the variant menu for each of the plurality of input units, and the menu common data, which are common in the variant menus and independent from the input units, can be contained so that the information concerning the operational status can be contained in association with the menu common data each time when an input operation is provided through the input unit, and the menu in response to the currently used input unit can be created and displayed based on the menu specific data, the menu common data, and the information concerning operational status. Further, when the input units are switched, the menus are switched to one corresponding to the currently used input unit. In this regard, the menu to be displayed inherits the operational status of the user at the time of switching or the operational status before switching. Therefore, not only the menus are switched according to the input units being used, but also the user-based operational status can be maintained; therefore, operability in selecting a menu can be improved.

BRIEF DESCRIPTION OF ACCOMPANYING DRAWINGS

FIG. 1 A diagram to illustrate an external view of a terminal device according to a first embodiment of the present invention.

Figure 2:
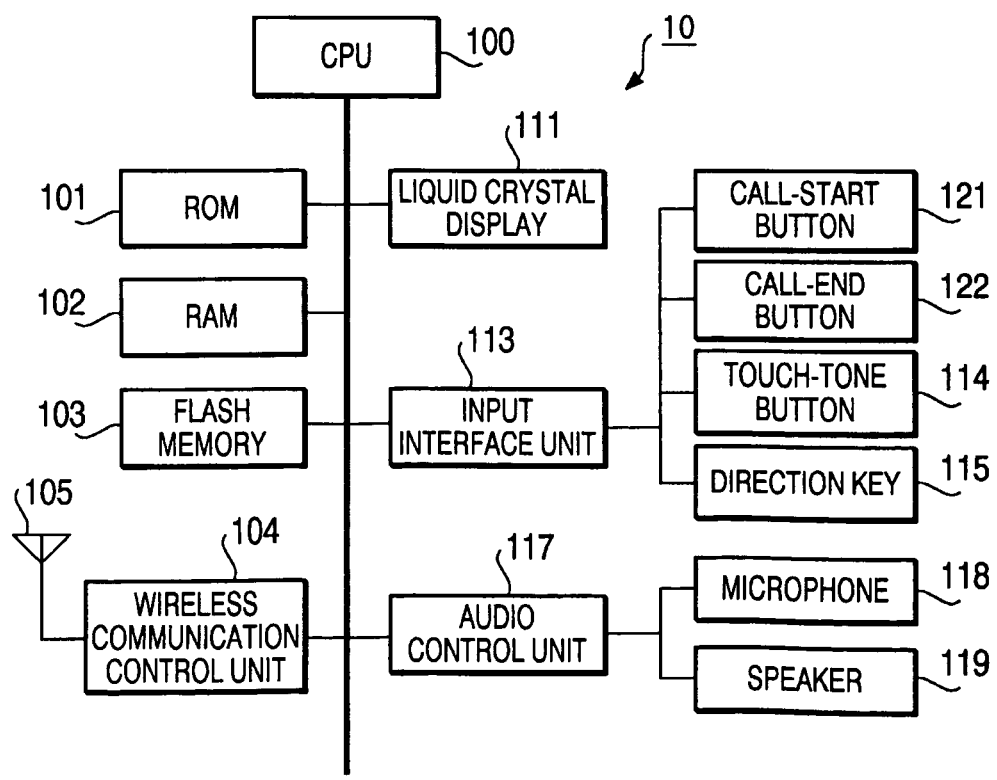

FIG. 2 A diagram to illustrate a hardware configuration of the terminal device according to the first embodiment of the present invention.

Figure 3:
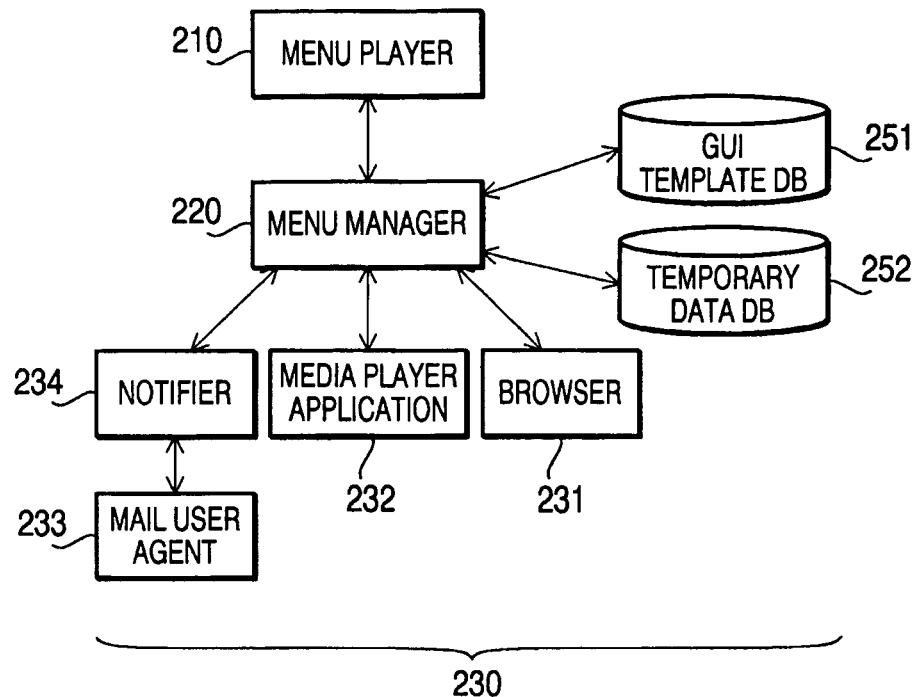

FIG. 3 A diagram to illustrate a software configuration of the terminal device according to the first embodiment of the present invention.

Figure 4:
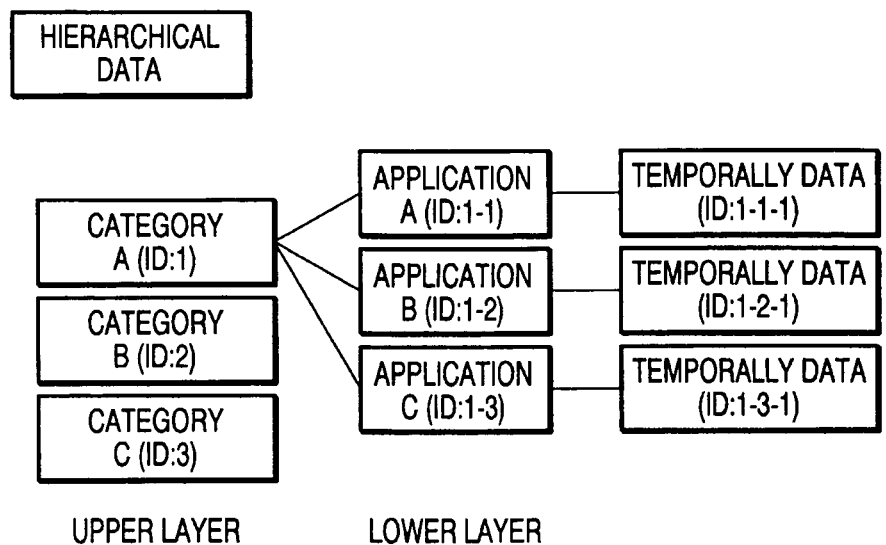

FIG. 4 A diagram to illustrate GUI templates according to the first embodiment of the present invention.

Figure 5:
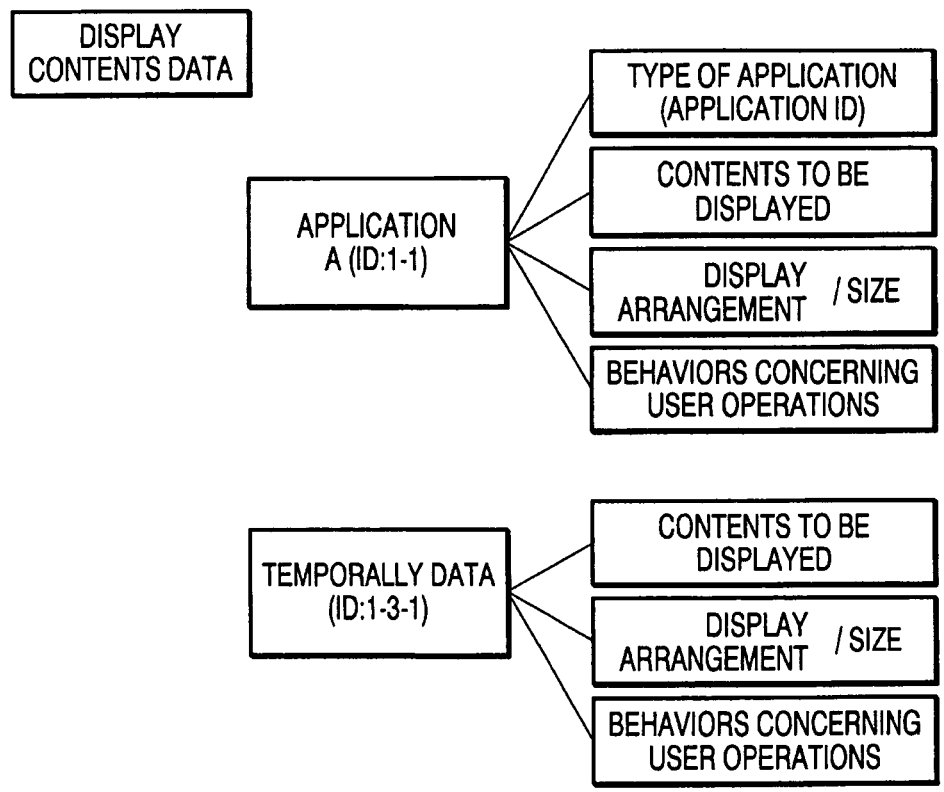

FIG. 5 A diagram to illustrate GUI templates according to the first embodiment of the present invention.

Figure 6:
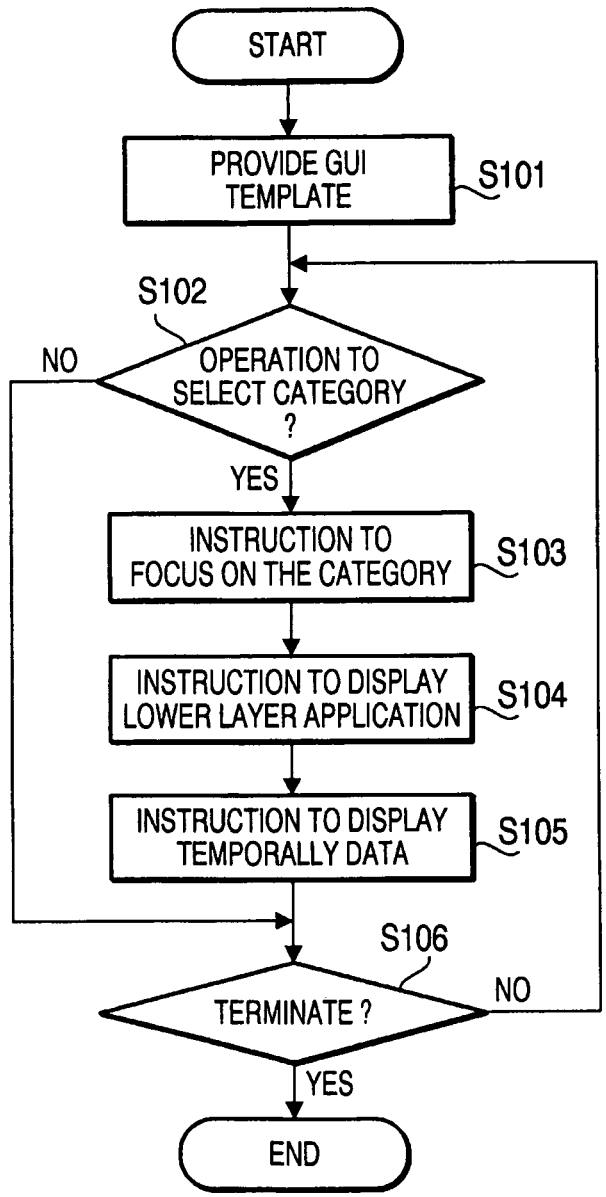

FIG. 6 A flowchart to illustrate a process to be executed by a menu player according to the first embodiment of the present invention.

Figure 7:
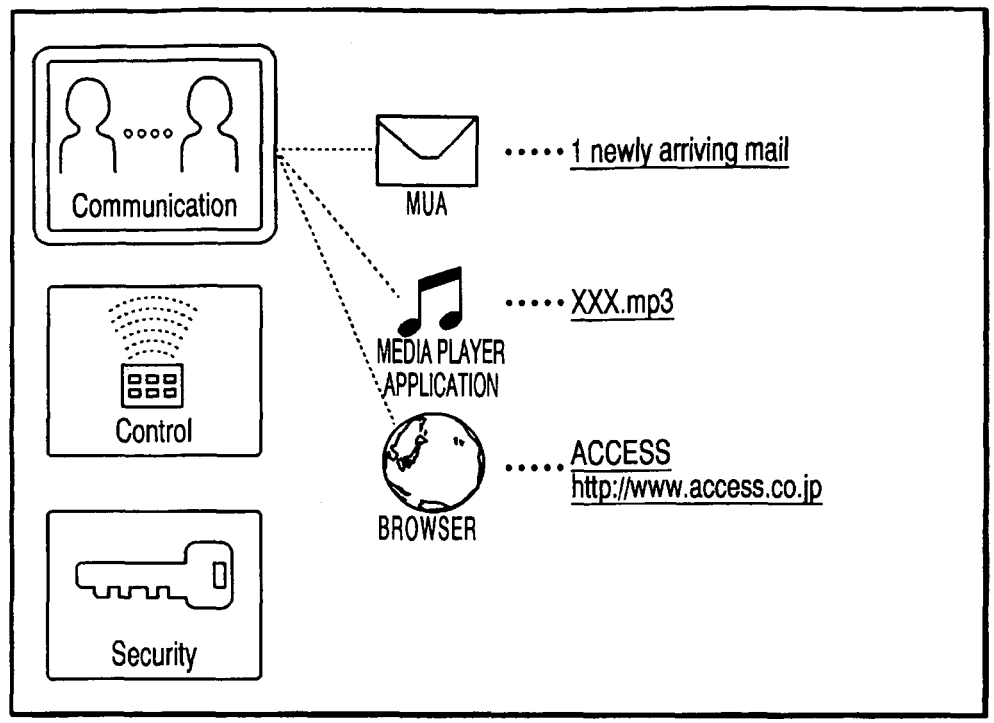

FIG. 7 A diagram to illustrate a window to be displayed by the menu player according to the first embodiment of the present invention.

Figure 8:
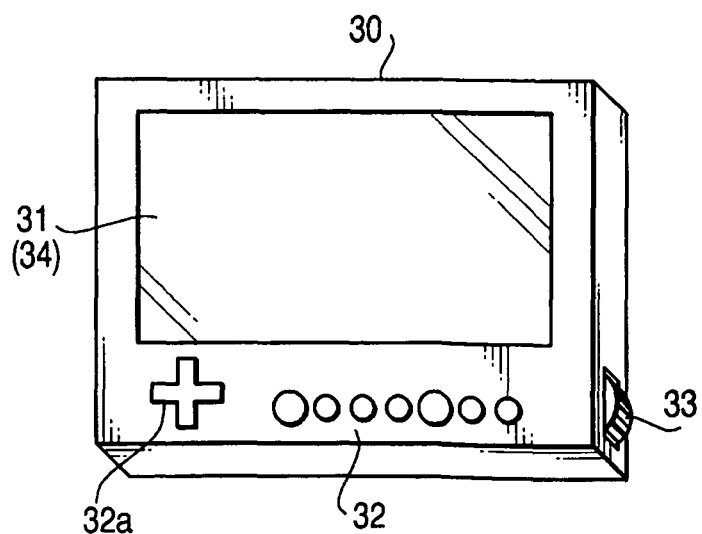

FIG. 8 A diagram to illustrate an external view of a terminal device according to a second embodiment of the present invention.

Figure 9:
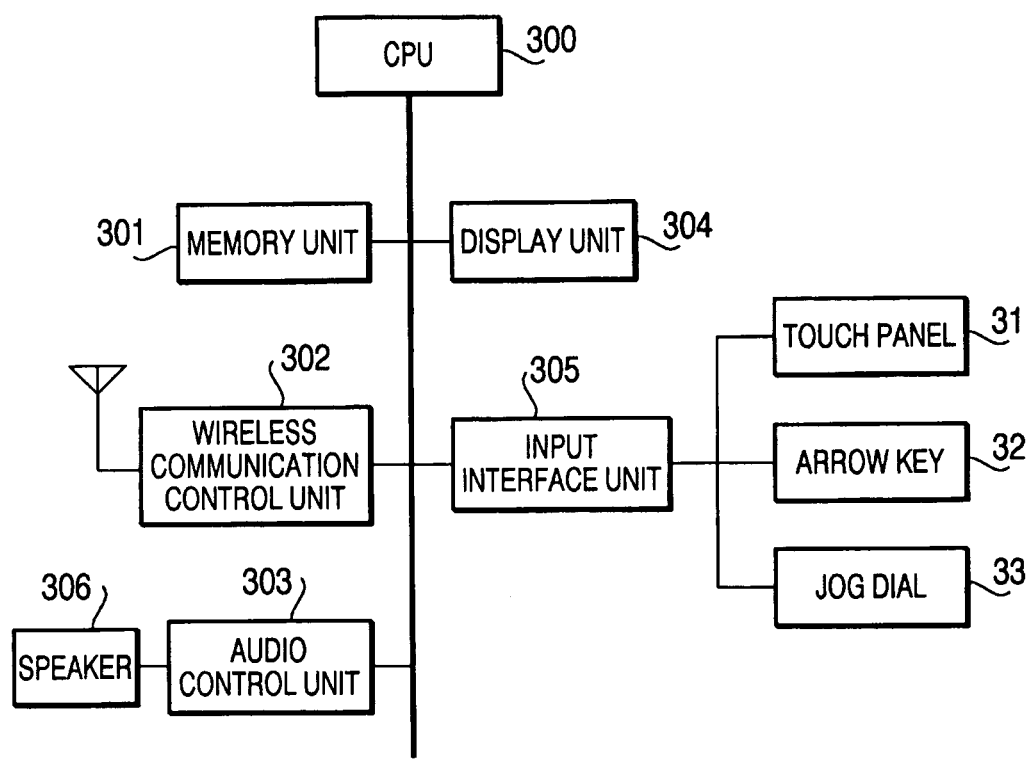

FIG. 9 A diagram to illustrate a hardware configuration of the terminal device according to the second embodiment of the present invention.

Figure 10:
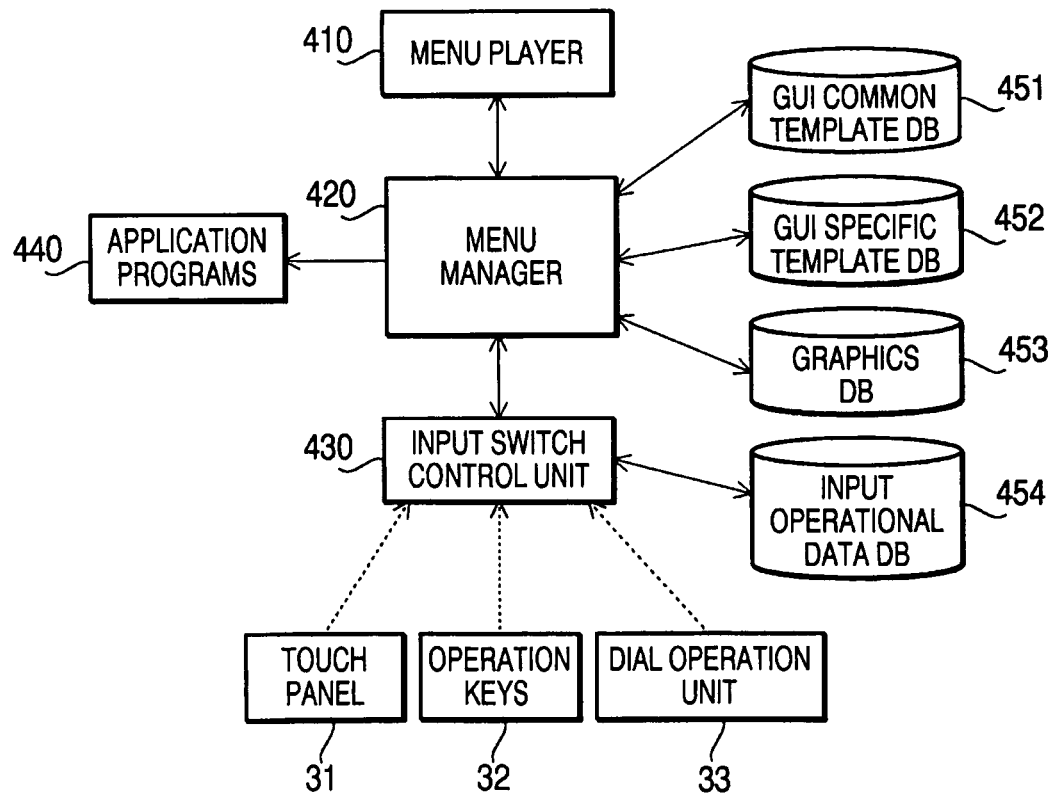

FIG. 10 A diagram to illustrate a software configuration of the terminal device according to the second embodiment of the present invention.

Figure 11:
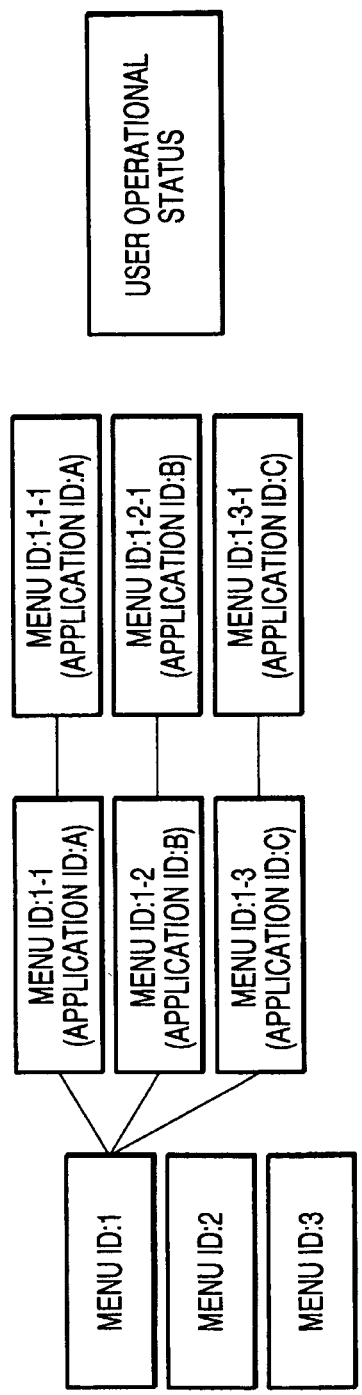

FIG. 11 A diagram to illustrate GUI common templates according to the second embodiment of the present invention.

Figure 12:
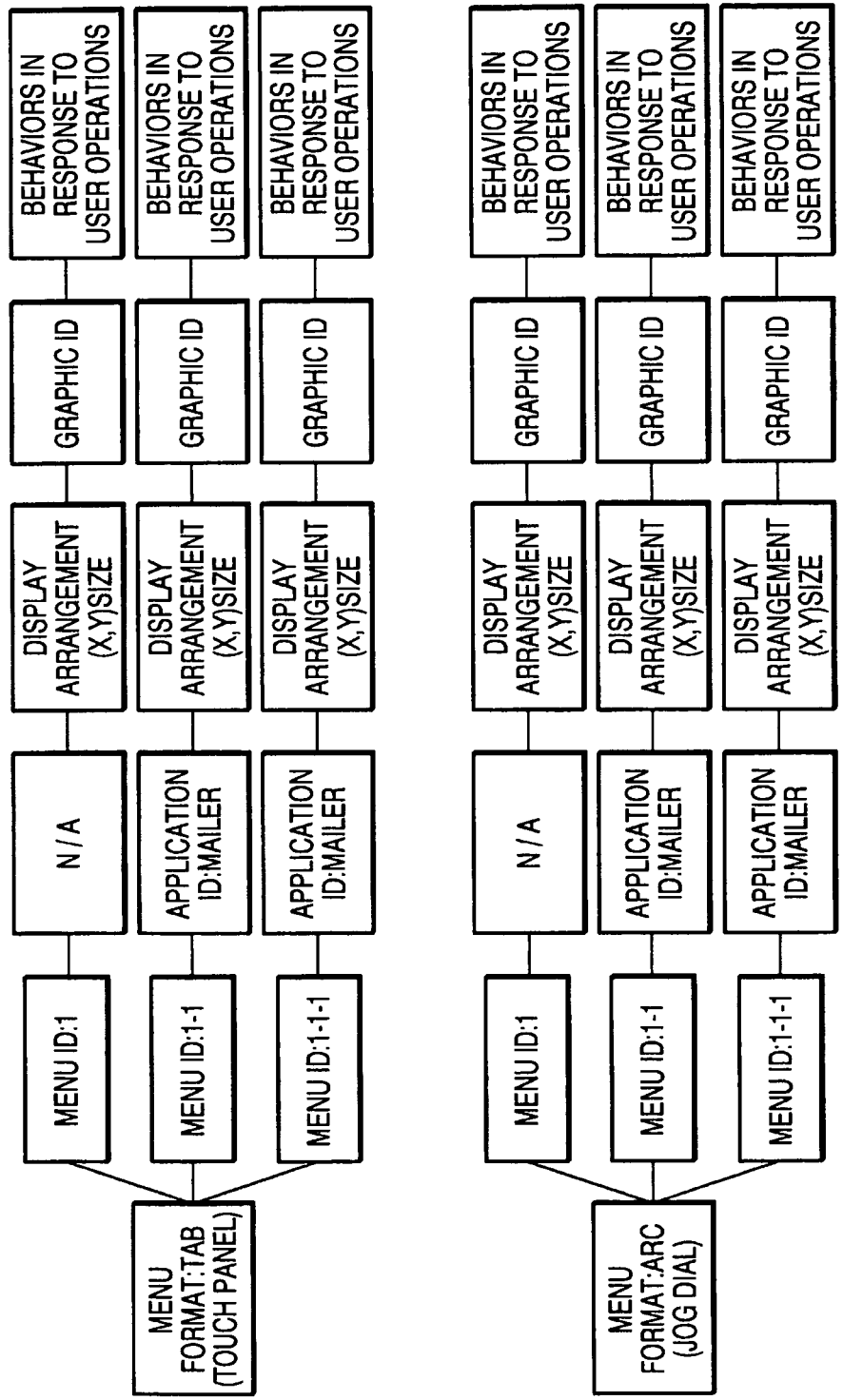

FIG. 12 A diagram to illustrate GUI specific templates according to the second embodiment of the present invention.

Figure 13:
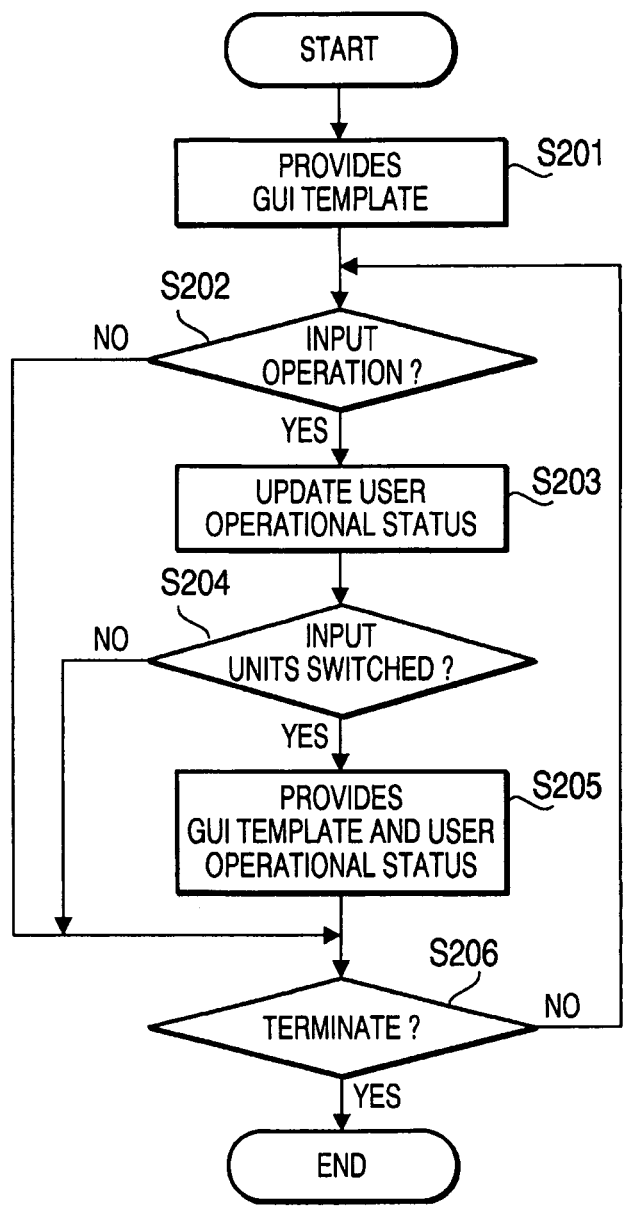

FIG. 13 A flowchart to illustrate a process to be executed by a menu manager according to the second embodiment of the present invention.

Figure 14:
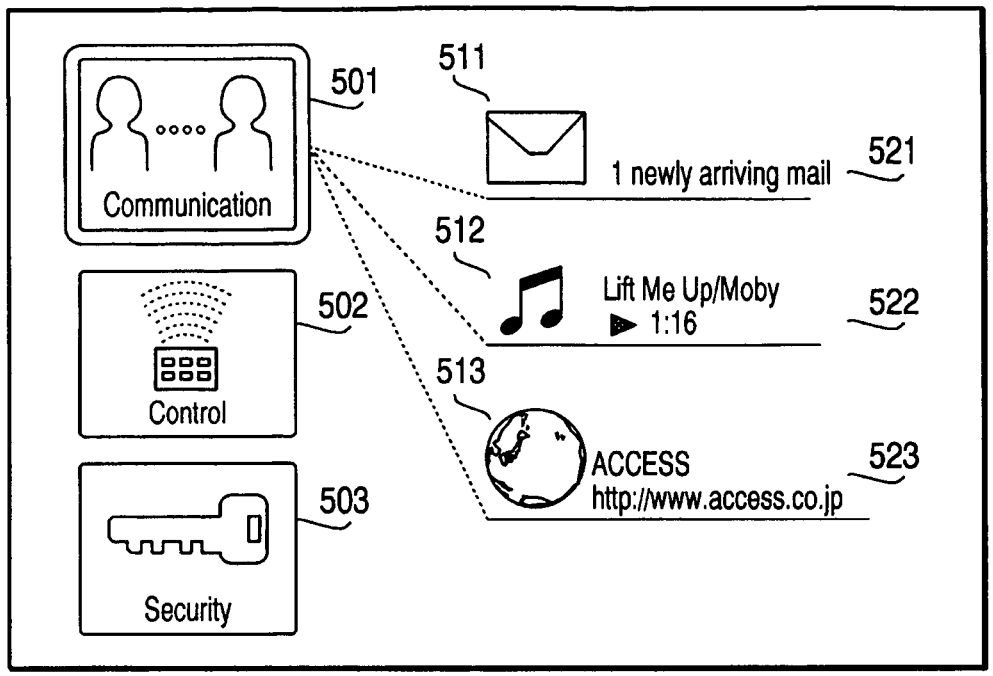

FIG. 14 A diagram to illustrate a menu window in a list format according to the second embodiment of the present invention.

Figure 15:
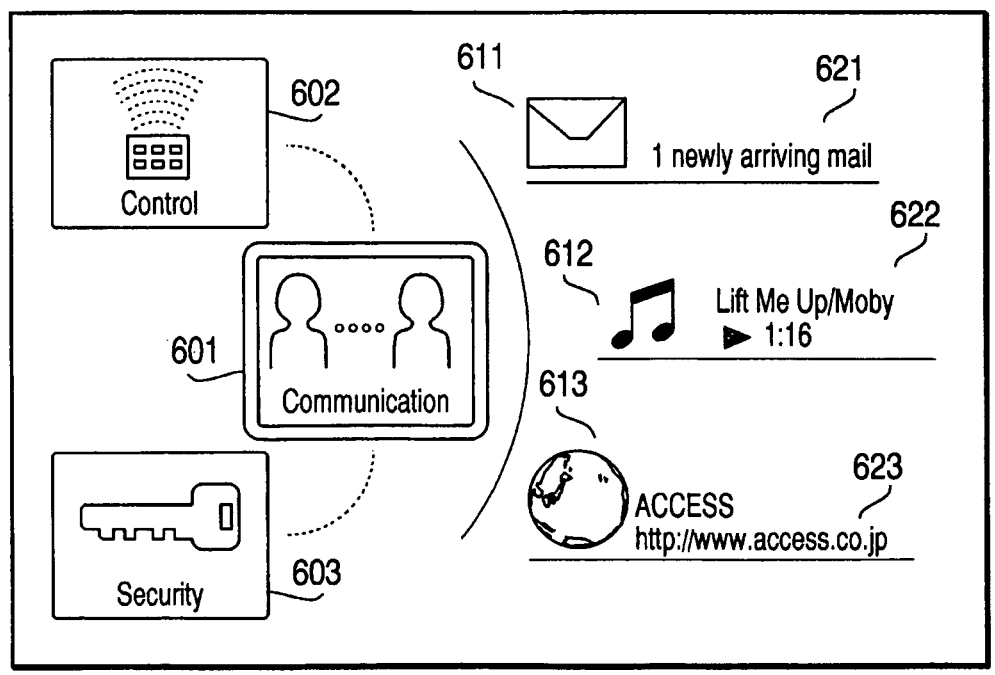

FIG. 15 A diagram to illustrate a menu window in an arc format according to the second embodiment of the present invention.

Figure 16:
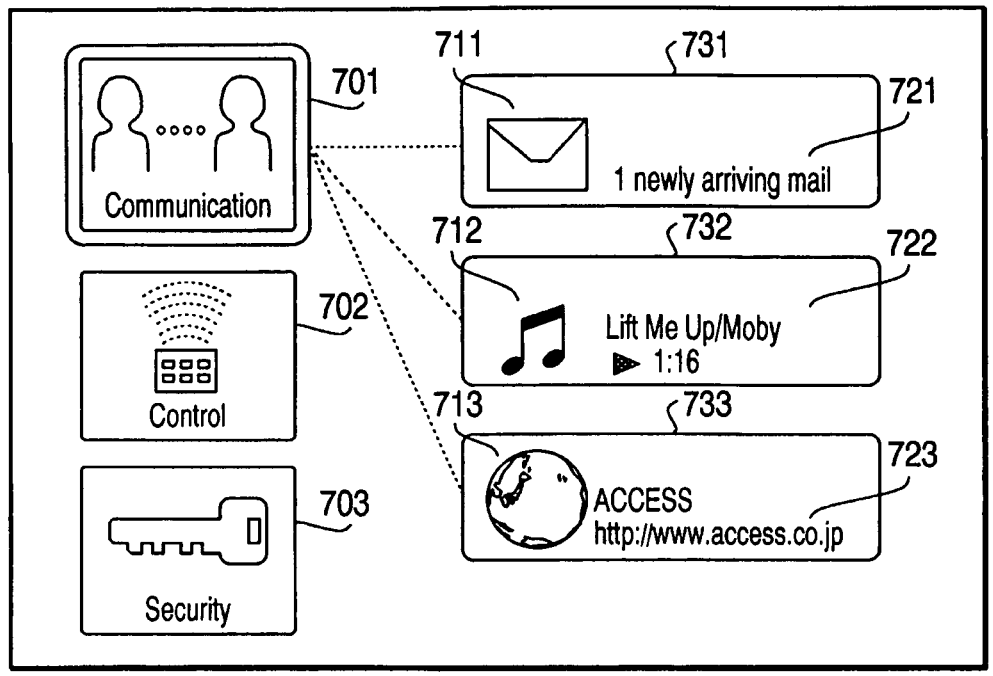

FIG. 16 A diagram to illustrate a menu window in a tab format according to the second embodiment of the present invention.

Figure 17:
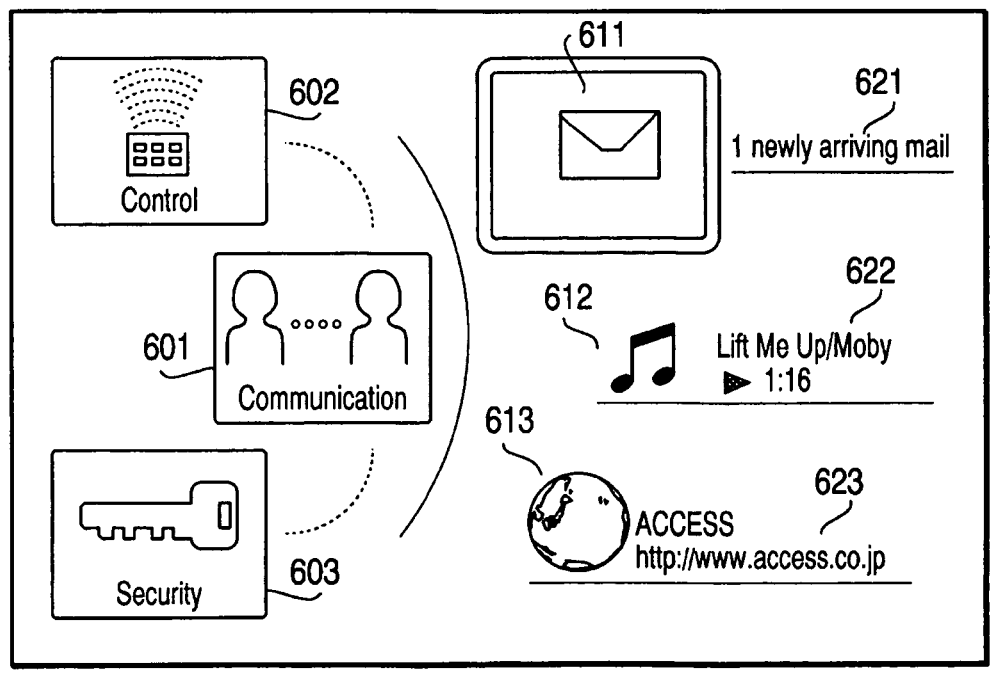

FIG. 17 A diagram to illustrate a menu window in an arc format according to the second embodiment of the present invention.

EXPLANATION OF REFERENCE NUMERALS 10 cell phone
100, 300 CPU
101 ROM
102 RAM
103 flash memory
111, 34 liquid crystal display
113, 305 input interface unit
210, 410 menu player
220, 420 menu manager
231 browser
232 media player application
233 mail user agent
234 notifier
251 GUI template DB
252 temporary data DB
30 terminal device
31 touch panel
32 operation keys
32a direction key
33 dial operation unit
301 memory unit
302 wireless communication control unit
303 audio control unit
304 display unit
306 speaker
430 input switch control unit
451 GUI common template DB
452 GUI specific template DB
453 Graphics DB
454 input operational data DB

DETAILED DESCRIPTION OF PREFERRED EMBODIMENTS

First Embodiment

Hereinafter, referring to the accompanying drawings, a terminal device according to a first embodiment of the present invention will be described.

FIG. 1 illustrates an external view of a terminal device 10 according to the present invention, and FIG. 2 illustrates a functional block diagram to illustrate a hardware configuration of the terminal device 10. As shown in FIG. 1, a liquid crystal display 111 and an operation unit are provided on an operation panel side of a chassis of the terminal device 10. The operation unit includes touch-tone buttons 114, a direction key 115, a call-start button 121, and a call-end button 122. On an upper side of the operation panel, pores for a speaker 119 and an antenna 105 are provided while pores for a microphone 118 is provided on a lower side of the operation panel. In the present embodiment, a cell phone is referred to as the terminal device of the present invention; however, the present invention can be applied to various terminal devices such as a PC, a PDA, a TV with various application programs installed, and the like, and application of the present invention is not limited to the cell phone.

The functional block diagram shown in FIG. 2 will be described. The terminal device 10 is provided with a CPU 100 to control the entire device. A ROM 101, a RAM 102, a flash memory 103, a wireless communication control unit 104, a liquid crystal display 111, an input interface unit 113, and an audio control unit 117 are respectively connected to the CPU 100. Further, the wireless communication control unit 104 is connected with the antenna 105, the input interface unit 113 is connected with the keys in the operation unit, and the audio control unit 117 is connected with the microphone 118 and the speaker 119. The operation unit being connected with the input interface unit 113 includes a unit to move a pointer which is displayed on a screen and a touch panel utilizing the liquid crystal display 111.

The ROM 101 is a non-volatile read only memory to store various programs (including application software) to be executed by the CPU 100 and fixed data. The RAM 102 is a writable memory which provides a work area for the CPU 100 and a temporary memory area of data. The flash memory 103 is a non-volatile rewritable memory to store additional application programs and various data.

The wireless communication control unit 104 is provided with a function to wirelessly communicate to exchange audio and data with a base station through the antenna 105. The liquid crystal display 111 composes a display unit having a screen. The input interface unit 113 is provided with a function to receive inputting operations through the touch-tone buttons 114 and the direction key 115. The audio control unit 117 is connected with the microphone 118 and the speaker 119. The audio control unit 117 controls input and output of audio through the microphone 118 and the speaker 119.

FIG. 3 illustrate a configuration of various software programs in the terminal device 10. The terminal device 10 includes a menu player 210, a menu manager 220, and various application programs 230 which are stored in the ROM 101, the flash memory 103, and the like. The menu player 210 and the menu manager 220 can be a part of an operating system or ones of the application programs. The application programs 230 include, for example, a browser 231, a media player application 232, a mail user agent 233, and a notifier 234. Further, the terminal device 10 is provided with a GUI template DB (database) 251 and a temporary data DB 252. The GUI template DB 251 may be stored in the ROM 101 or the flash memory 103 to be rewritable. The temporary data DB 252 is stored in the flash memory 103 to be rewritable.

The GUI template DB 251 is provided with a GUI template. The GUI template is data to define display of a menu window, in which an application program 230 to be displayed on the screen of the terminal device 10 is selected. The GUI template includes hierarchy data to define a hierarchical structure of menu items and display contents data to define contents of the menu items to be displayed.

The temporary data DB 252 is provided with temporary data (status information). The temporary data refers to data representing contents to be displayed according to the GUI template and is variable according to conditions of the application program 230. In other words, the temporary data includes information representing current or past status of the application program 230. The application programs 230 can designate data to be stored as the temporary data.

The menu manager 220 is provided with a function to obtain the temporary data from the application programs 230, a function to store the obtained temporary data in the temporary data DB 252, a function to obtain the GUI template from the GUI template DB 251, a function to lay out the temporary data obtained from the temporary data DB 252 in the GUI template, and a function to provide the menu player 210 with the GUI template.

The menu manager 220 is further provided with a function to receive inputs of user operations (e.g., selection of the menu items, instruction of activating an application program, etc.), and a function to provide the temporary data to the menu player 210 and instruct the menu player 210 to update the GUI template.

The menu manager 220 may obtain the temporary data from the application program 230 to store in the temporary data DB 252 either when the application program 230 provides the temporary data periodically to the menu manager 220 in an arbitrary cycle or when the menu manager 220 collects periodically the temporary data from the application program 230 in an arbitrary cycle.

The temporary data is respectively assigned a predetermined ID when the menu manager 220 stores the temporary data in the temporary data DB 252. As described later, the temporary data can be allocated in a predetermined data area of the GUI template according to the assigned ID. Optionally, the temporary data may be directly stored in the temporary DB 252.

The menu manager 220, further, provides instructions based on the user operations to a corresponding application program according to a type (application ID) of the application program.

The menu player 210 is provided with a function to display a menu window on the screen according to the GUI template provided by the menu manager 220. Further, when an instruction to switch the menu windows is given by the menu manager 220, which receives operations such as user operations, the menu player 210 reconstruct the menu window based on the GUI template. That is, for example, when an item in a menu window in an upper layer of a hierarchical structure is focused, corresponding data in a lower layer is displayed. Further, in the present embodiment, the temporary data in association with the data in the lower layer is displayed. Thus, the user can recognize, for example, an incoming mail by viewing the temporary data being displayed. It should be noted, referring to FIG. 3, that the menu manager 220 and the menu player 210 are described as independent software programs, however, the menu player may, for example, include the menu manager 220.

The browser 231 is an application program which connects the cell phone 10 upon activation with the communication network through the wireless communication control unit 10 to enable the user to view various contents (i.e., web pages). The browser 231 may designate a name or a URL of a web page currently being displayed as the temporary data during the activation. Meanwhile, when the browser is inactive, a name or a URL of a web page which is lastly viewed, bookmarked, or set to be a homepage may be designated as the temporary data.

The media player application 232 is an application program which is capable of reproducing music, videos, images, and the like. During activation, the media player application 232 can designate data currently being played (e.g., information concerning a background music being played) as the temporary data. Meanwhile, when the media player application 232 is inactive, data lastly or lately played can be designated as the temporary data.

The mail user agent (MUA) 233 is an application which is provided with a function to create and exchange mails such as e-mails, and the notifier 234 is an application which is provided with a function to monitor receipt of the mails. The notifier 234 may be a part of either the MUA or the operating system, and the like, and can be activated at any times even when the MUA is inactive. The notifier 234 can continuously check information concerning newly arriving push-delivered mails. The notifier 234 can designate the information concerning the newly arriving mails and unread mails as the temporary data.

As described above, the temporary data designated in the application program 230 may be provided by the application program 230 to the menu manager 220 or obtained arbitrarily by the menu manager from the application program 230.

FIG. 4 illustrates the hierarchical data as a part of the data in the GUI template. An upper layer (a category layer) is configured with category items (i.e., items indicating the upper layer) and includes a category A (ID: 1), a category B (ID: 2), and a category C (ID: 3). A lower layer below the category layer is configured with application items and includes, for example, an application A (ID: 1-1), an application B (ID: 1-2), and an application C (ID: 1-3). Further, each item in the application layer includes items to be displayed in a further lower layer. That is, the application A (ID: 1-1) is associated with temporary data (ID: 1-1-1), the application B (ID: 1-2) is associated with temporary data (ID: 1-2-1), and the application C (ID: 1-3) is associated with temporary data (ID: 1-3-1) respectively. As shown in FIG. 4, each item is provided with an ID.

FIG. 5 illustrates display contents data, which is a part of the data in the GUI template. The display contents data is data which mainly defines contents to be displayed on the display screen and is associated with an ID defined on the basis of the hierarchical data.

For example, the application A (ID: 1-1) is associated with data which defines (1) a type of the application (i.e., application ID), (2) contents to be displayed, (3) display arrangement/size, (4) behaviors concerning user operations.

(1) The data (application ID) to define the type of the application associates the MUA 233 with the application A (ID: 1-1). Thus, when the user selects an item in the application A, for example, an instruction to activate can be given to the application.

(2) The data to define the contents to be displayed defines display patterns of the items in the application A, which include, for example, an icon, text, and an image.

(3) The data to define the display arrangement/size defines positions and sizes of the contents to be displayed, which are defined in the above (2). The data to define the display arrangement/size may be included in the hierarchical data shown in FIG. 4. That is, the specific hierarchical structure, and positions and sizes of the items to be displayed may be included in the hierarchical data to be defined.

(4) The data to define the behaviors concerning user operations defines behaviors to be performed when the user selects the items. The behaviors include, for example, that an application program being associated with the item is activated (e.g., in case of the application A, the MUA 233 is activated) when an item is selected, and that data in a lower layer is displayed when an item is focused.

Further, for example, in an item in the temporary data (ID: 1-3-1) is associated with the data which defines contents to be displayed (2), display arrangement/size (3), and behaviors concerning user operations (4). The item in the temporary data may not necessarily include the data (application ID) to define the type of the application program (1), since the data (application ID) which defines the type of the application program (1) is included in the items of the application program (e.g., the application C) in the upper layer. Further, the data which defines the contents to be displayed (2) being associated with the item in the temporary data is obtained from the temporary data DB 252 and assigned an ID (ID: 1-3-1 in the present case) which is identical to the ID being stored in the temporary data DB 252.

Although it has been mentioned that the data representing the contents to be displayed, as shown in FIG. 5, is a part of the GUI template; however, the data may be stored in another independent database. Further, with reference to FIG. 3, it has been mentioned that the GUI template DB 251 and the temporary data DB 252 are individual databases; however, the temporary data DB 252 may be included in the GUI template DB 251.

The temporary data configured in the application program 230 is processed to be displayed in a predetermined position in the menu window when an ID in the GUI template is designated. Therefore, a creator of the GUI template are simply required to prepare items for the temporary data without being aware of which application programs are equipped in the terminal device 10 and which temporary data should be displayed in each application program. Thus, according to the embodiment of the present invention, workloads in designing the display of the menu can be reduced.

FIG. 6 is a flowchart to illustrate a process to be executed by the menu manager 220. This process is initiated in accordance with activation of the terminal device 10 or activation of the menu manager 220 in a predetermined method. In step S101, the menu manager 220 provides a GUI template to the menu player 210. In this regard, the menu manager 220 obtaining the GUI template displays a menu window (an initial window) according to the GUI template. In the present embodiment, solely the category layer is displayed in the initial window.

When the initial window is displayed, the user viewing the window operates the terminal device 10 by key operations and the like. The menu manager 220 receives the user's operation and judges as to whether the operation was to select any item in the category layer (S102). If the menu manager 220 judges that the operation to select any item in the category layer is given (S102: YES), the menu manager 220 proceeds to S103. If no item in the category layer is selected (S102: NO), the menu manager 220 proceeds to S106.

In S103, an instruction to switch displays is given to the menu player 210 so that the selected category item becomes focused. The menu player 210 focuses on the category item as instructed and displays on the window. Thereafter, the menu manager 220 proceeds to S104.

In S104, the menu manager 220 instructs the menu player 210 to display items in the application layer, which is in a lower layer of the selected category item, on the screen. The contents to be displayed by the menu player 210 is in a configuration based on the contents data to be displayed as shown in FIG. 5. When the items in the application layer are displayed, the user is allowed to view the displayed window to select the items. When the user selects and performs a predetermined operation, the behaviors concerning the user operation as indicated in FIG. 5 are conducted. Following the process in S104, a process in S105 is performed.

In S105, an instruction to display the temporary data corresponding to the application item being displayed in S104 is given to the menu player 210. That is, upon judgment of the menu manager 220 that the category item in the upper layer is selected, the menu manager 220 instructs to display the application items. Thereafter (or simultaneously) the menu manager 220 obtains the temporary data containing the ID of the category item (i.e., the ID with the uppermost digit of the ID being identical) to provide to the menu player 210 and updates the temporary data corresponding to the GUI template (which was provided by the menu manager 220 in S101) maintained by the menu player 210. Accordingly, the menu player 210 displays the menu window based on the GUI template of which temporary data is updated.

It should be noted in S105 that the menu manager 220 may obtain the temporary data containing the ID of the selected category item from the temporary data DB 252 and include the obtained temporary data in the GUI template so that the GUI template is provided to the menu player 210 along with the temporary data.

Thus, according to the process in S104 and S105, the lower layer (application layer) and the temporary data thereof can be displayed simply when the user selects one of the items in the upper layer (category layer). The user is allowed to recognize current or past status of a plurality of application programs at a glance on the screen; therefore, usability to select an application program is improved.

In S106, it is judged as to whether the menu manager 220 will be terminated. If the menu manager 220 is not terminated (S106: NO), the process returns to S102. If the menu manager 220 is terminated (S106: YES), the process is terminated.

FIG. 7 illustrates a window to be displayed by the menu player 210. Icons respectively representing items "communication," "control," and "security" are displayed in the category layer. In the present example, the item "communication" is focused, and icons respectively representing items "MUA," "media player application," and "browser" are displayed in the lower layer. Further, the icons representing "MUA," "media player application," and "browser" are respectively provided with "1 newly arriving mail," a filename "XXX.mp3," and a web page name and a URL "ACCESS http://www.access.co.jp/top.html" to be displayed. In this display, the user can view the temporary data of each application program and select the application item and the display of the temporary data by key operations and the like so that a desired application program can be activated. Thus, information concerning the newly arriving mail and the status of the active application (e.g., a file name of a background music currently being played) can be displayed in the menu window so that usability to select an application program is improved.

It should be noted that the temporary data DB 252 may be configured to include IDs to specify individual files in each application programs so that, when the user selects the displayed temporary data through key operations, the files can be directly activated according to instructions to activate the files, corresponding to the application program, given by the menu manager 220.

The application menu in the above first embodiment is provided with the menu window configured in the hierarchical structure; however, optionally, the menu window provided to the application menu may not be hierarchical. That is, all the application programs equipped in the terminal device may not be classified on the type basis, but may be, for example, displayed in a list along with status information of each application program. When a number of the application program equipped in the terminal device is relatively small, the menu window in a non-hierarchical structure is more advantageous to improve usability. In this regard, it is more preferable to list the application programs in an order corresponding to frequency of usage. With the above configuration, similarly to the first embodiment, the status information is displayed along with the application items; therefore, the operational status of the application programs can be recognized without activating or selecting the application programs, and usability to activate the application programs can be improved.

Second Embodiment

Hereinafter, referring to the drawings, a terminal device according to a second embodiment of the present invention will be described.

FIG. 8 illustrates an external view of a terminal device 30 according to the present invention, and FIG. 9 is a functional block diagram to illustrate a hardware configuration of the terminal device 30. As shown in FIG. 8, a display unit and an operation unit are provided to a chassis of the terminal device 30. The operation unit includes a touch panel 31, operational keys 32, and a dial operation unit 33. The operation keys 32 include a direction key 32a. The display unit includes a liquid crystal display 34, which is disposed beneath the touch panel 31. In the present embodiment, a terminal device 30 as shown in FIG. 8 is referred to as the terminal device of the present invention; however, the present invention can be applied to various terminal devices such as a cell phone, a PC, a PDA, a TV with various application programs installed, and the like, and application of the present invention is not limited to the terminal device as shown in FIG. 8.

The functional block diagram shown in FIG. 9 will be described. The terminal device 30 is provided with a CPU 300 to control the entire device. A memory unit 301, a wireless communication control unit 302, an audio control unit 303, the display unit 304, and an input interface unit 305 are respectively connected to the CPU 300.

The memory unit 301 includes a ROM, a RAM, a flash memory, and the like. The ROM is a non-volatile read only memory to store various programs (including application programs) to be executed by the CPU 300 and fixed data. The RAM is a writable memory which provides a work area for the CPU 300 and a temporary memory area of data. The flash memory is a non-volatile rewritable memory to store additional application programs and various data. The memory unit 301 may be provided with a hard disk drive. The hard disk drive is, similarly to the flash memory, a rewritable memory medium to store additional application programs and various data.

The wireless communication control unit 302 is provided with a function to wirelessly communicate to exchange audio and data with a base station through an antenna, which is not shown.

The audio control unit 303 is connected with a speaker 306 and controls output of audio through the speaker 306.

The display unit 304 is provided with a function to output to display windows for menus and various application programs according to the control of the CPU 300 through the liquid crystal display 34 (which may be also referred to as a display screen).

The input interface unit 305 is connected with input units including the touch panel 31, the operational keys 32, and the dial operation unit 33. The input interface unit 305 is provided with a function to receive input operations from those. Further, the input interface unit 305 may be connected with a microphone. The terminal device 30 may include audio input through the microphone and the like as the input unit.

FIG. 10 is a diagram to illustrate configurations of various software and programs (including a program as a part of software) concerning menu displays and operations and databases (DBs). The terminal device 30 is equipped with menu player 410, menu manager 420, an input switch control unit 430, and various application programs 440 as the various software and programs (including a program as a part of software). Further, the terminal device 30 is equipped with a GUI common template DB 451, a GUI specific template DB 452, a graphics DB 453, an input operational data DB 454 as the databases. The software programs and the databases are stored in the memory unit 301.

The menu player 410 is provided a function to display the menu on the display screen according to the GUI template provided by the menu manager 420. Further, the menu player 410 is provided with a function to change focused positions based on the GUI template and obtains a new GUI template to reconstruct the menu display according to an instruction to switch displays of the menu display given by the menu manager 420 through a user's operation.

The menu manager 420 is provided with a function to generate a GUI template based on data being extracted from the GUI common template DB 451, the GUI specific template DB 452, and the graphics DB 453. The menu manager 420 is further provided with a function to receive information concerning input operations passed from the input switch control unit 430, a function to provide instructions for activation and the like to the application programs, and a function to provide the generated GUI template to the menu player 410. Moreover, the menu manager 420 has a function to judge as to whether the input units are switched based on the information provided by the input switch control unit 430. Furthermore, a function to create user operation status data, which will be described later (as an example of data concerning operational status), based on the information provided from the input switch control unit 430 and update the user operation status data contained in the GUI common template DB 451 is provided. The menu manager 420 is further provided with a function to obtain the user operation status data from the GUI common template DB 451 and provide an instruction to switch displays to the menu player 410 based on the data. The menu manager 420 may be configured to be a part of the menu player 410.

The input switch control unit 430 recognizes inputs from the touch panel 31, the operation keys 32, and the dial operation unit 33, stores input operational data (as an example of data concerning operational status) which indicates the input units being used, portions on the display screen being touched (in case of the touch panel 31), and specific operations being performed (in cases of the operation keys 32 and the dial operation unit 33), and provides the input operational data to the menu manager 420.

The application programs 440 includes, for example, a browser, a media player application, and a mailer. The browser 231 is an application program which connects the terminal device 30 upon activation with the communication network through the wireless communication control unit 302 to enable the user to view various contents (i.e., web pages). The media player application is an application program which is capable of reproducing music, videos, images, and the like. The mailer is an application program having a function to create and exchange mails such as e-mails, to monitor receipt of the mails.

The GUI template will be described hereinbelow. The GUI template is data to define contents of a menu window to be displayed (e.g., displaying methods and operations to be performed in response to user operations, which are given in response to the display), in which an application program 440 to be displayed on the liquid crystal display 34 (display screen) of the terminal device 30 is selected. In the present embodiment, the GUI template defines data representing a different menu for each input unit; therefore, the GUI template is configured with specific data (menu specific data) for the menu corresponding to each input unit and common data (common menu data) which is common in all the menus and independent from the input units. Thus, the menus are provided on the input unit basis while the menus are in uniform and interoperable.

The menu specific data is data concerning the menus, each of which is associated with an input unit and includes, for example, data concerning menu items, i.e., options to configure the menu, such as those listed below.
(1) Data concerning layout of the menu items (i.e., display positions, sizes, and the like).
(2) Data to define graphics data concerning the menu items such as icons (i.e., graphic ID and data representing the graphics).
(3) Types of the application programs (i.e., application IDs), when the menu items are associated with the application programs.
(4) Data to define categories when the menu items are classified into categories.
(5) Operations corresponding to user's operations performed to the menu items (e.g., displaying a different menu and focusing).

The menu specific data may include data concerning the entire menus such as those listed below.
(1) Data for background image of the menu.
(2) BGM (Background music).
(3) Items for settings such as switching on and off of a backlight.
Thus, the specific data includes data sets as listed above to configure the menu for each input unit.

The common menu data defines data to be unified throughout the different menus regardless of the input units so that the operational status at the time of switch is maintained even when the input units are switched. The common menu data can be represented by menu structure data, which defines hierarchical structures of the menu items as options to be selected in the menus. The menu structure data merely defines the data structures of the menu items, and the present invention is not limited to the case in which the menus are hierarchically displayed according to the hierarchical structure. For example, icons representing the menu items which are aligned at predetermined intervals can be considered as an embodiment of the present invention as long as the data structure is in a hierarchy. Further, the common menu data may include a background image, a BGM, configuration data such as switching on and off of the backlight, and application ID data which can be associated with the menu items.

Moreover, in the present invention, information concerning the operational status can be stored each time an operation through the input unit is performed by the user, and a menu for each input unit can be created based on the GUI template so that a menu display window can be created based on the information concerning the operational status.

Thus, the GUI templates for each input unit are generated based on the above-described menu specific data and the common menu data. Further, user operational status data, which will be described later, is added to the GUI template to generate the data for menu display. Thus, based on the data for menu display, the menu window which shows the operational status indicating the user operational status is displayed. That is, the GUI data is generated to be intermediate menu data, which will be described later and is generated upon displaying anew or switching displays. Meanwhile, the data for menu display is generated upon each input operation.

The GUI common template DB 451 contains menu IDs, hierarchy data (menu structure data), application IDs, and the like. It is noted that the menu IDs may represent the hierarchy data. In other words, the menu items may be assigned the menu IDs which indicate the hierarchical structure. Further, the GUI common template DB 451 contains user operational status data, which is created by the menu manager 420 according to the data provided by the input switch control unit 430. The user operational status indicates the menu ID to be focused, the menu ID to be displayed, the menu ID to be selected, the menu ID to be presented as options to be selected, and the like. The user operational status data contained in the GUI common template DB 451 is updated by the menu manager 420; however, the GUI common template DB 451 should contain the user operational status data indicating at least immediately preceding status of the user operation. Thus, with the user operational status data indicating the immediately preceding status, the status prior to switching the input units can be reflected to the menu after the switching.

The GUI specific template DB 452 contains the menu specific data, which is used with the GUI template for the menu corresponding to the input unit. Thus, the menu manager 420 extracts the menu specific data on the basis of the menu corresponding to the input unit from the GUI specific template DB 452 to use with the GUI template.

The graphics DB 453 is a database to administrate graphics data for icons, images, text, and data (including the temporary data) to be displayed.

The input operational DB 454 contains the input operational data indicating information of the input unit, portions on the display screen being touched (in case of the touch panel 31), and operations being performed (in cases of the operational keys 32 and the dial operation unit 33).

FIG. 11 illustrates the data contained in the GUI common template DB 451. In the GUI common template DB 451, data indicating the menu items with the IDs being assigned and the user operational status data are contained.

Each menu item is assigned a menu ID. The menu ID indicates, for example, the hierarchical structure of the menu item. For example, a menu item (ID: 1) is associated with a menu items in a lower layer (ID: 1-1), (ID: 1-2), and (ID: 1-3). Further, the menu item (ID: 1-1) is associated with another menu item in a further lower layer (ID: 1-1-1). The menu item (ID: 1-2) is associated with another menu item in the further lower layer (ID: 1-2-1). And the menu item (ID: 1-3) is associated with another menu item in the further lower layer (ID: 1-3-1).

Moreover, the menu items may be assigned application IDs. The application IDs associate the menu items having the IDs with the application programs 440. In FIG. 11, the menu item (ID: 1-1) and the menu item (ID: 1-1-1) are associated with an application ID A. The menu item (ID: 1-2) and the menu item (ID: 1-2-1) are associated with an application ID B. The menu item (ID: 1-3) and the menu item (ID: 1-3-1) are associated with an application ID C.

The user status data contained in the GUI common template DB 451 includes data concerning the menu item being operated. That is, data indicating the menu ID being operated is included. The data is created by the menu manager 420 based on the data provided by the input switch control unit 430. For example, data indicating the menu item(s) being displayed, the menu item being focused, the menu item being selected, and the menu item as an option to be selected can be included.

Thus, the data to define the hierarchical structure of the menu items, the data to define the application programs being associated with the menu items (although the menu items may not necessarily be associated with application programs), and the data indicating the menu item being operated are contained in the GUI common template DB 451. These data are common among the menus which are different depending on the input units.

FIG. 12 is a diagram to illustrate the data contained in the GUI specific template DB 452. The GUI specific template DB 452 contains the menu specific data for each menu, which corresponds to the input unit. In the embodiment of the present invention, for example, menus in a "tab" format, a "list" format, and an "arc" format are respectively associated with menu specific data for the touch panel 31, for the operational keys 32, and for the dial operation unit 33.

For example, when the menu is in the "arc" format, the menu items therein (for example, ID: 1, ID: 1-1, ID: 1-1-1) are displayed in an "arc." Each of the menu items is associated with the menu specific data, which defines a type of the application program, a position and a size to be displayed (X, Y), a graphic ID, an behavior in response to a user operation, and the like.

The data to define the type of the application program corresponds to the application ID, which designates an application program to be activated. The application ID to be associated with the menu item may be obtained from the GUI common template DB 451 or the GUI specific template 452. That is, the application ID is obtained from either one of the GUI common template DB 451 or the GUI specific template DB 452.

The graphic ID is an ID to be used to match the menu item with the graphics data stored in the graphics DB 453. The graphics data designated by the graphic ID is extracted from the graphics DB 453 to be displayed on the display position of the menu.

The behavior in response to a user operation defines behaviors to be performed in response to a selection of the user. For example, such behaviors can include activating an application program being associated with a selected item when the menu item is selected and displaying a menu item, which corresponds to a menu item in an upper layer being focused, in a lower layer. The behaviors in response to a user operation may be defined for each menu ID, each application ID, and each menu format (e.g., list, arc, and tab).

FIG. 13 is a flowchart to illustrate a process to be executed by the menu manager 420. The process is initiated upon activation of the terminal device 30 or activation of the menu manager 420 according to a predetermined method. In S201, the menu player 410 is provided with a GUI template. The GUI template to be provided in this step is created based on data obtained from the GUI common template DB 451, the GUI specific template DB 452, the graphics DB 453 by the menu manager 420. In S201, a default GUI template may be provided to the menu player 410 by the menu manager 420. Alternatively, a default GUI template may be selected according to a type of the input unit which is used to instruct activation of the terminal device 30 or the menu manager 420. Alternatively, a GUI template to inherit the latest status at termination of the terminal device 30 or the menu manager 420 may be generated.

In S202, it is judged as to whether an input operation through any of the input units was given. When an input operation through an input unit is given, the input switch control unit 430 stores the input operational data in the input operational data DB 454 and provides contents of the data to the menu manager 420; therefore, in this step, it is judged as to whether the contents were provided to the menu manager 420. If it is judged that an input operation was given (S202: YES), the process proceeds to S203. If it is judged no input operation was given (S202: NO), the process proceeds to S206.

In S203, user operational status data is created based on the input operational data provided by the input switch control unit 430 according to the input operation given in S202 to update the user operational status data in the GUI common template DB 451. In this regard, the GUI common template DB 451 maintains the user operational status data before the update.

In S204, it is judged as to whether the input operation received by the menu manager 420 in S202 was given through an input unit different from input units through which preceding input operations were given. In other words, the menu manager 420 examines contents of the input operational data to judge as to whether the input units have been switched. For example, an affirmative judgment is made when the user who has been operated the terminal device 30 through the touch panel 31 now uses the operation keys 32 or the dial operation unit 33, i.e., when the input units are switched from one to the other. If it is judged that the input units were switched (S204: YES), the process proceeds to S205. If the input unit is not switched (S204: NO), the process proceeds to S206.

In S205, a GUI template corresponding to the input unit, which is switched to be used, is generated. That is, the menu manager 420 extracts menu specific data for the menu corresponding to the input unit from the GUI specific template DB 452 upon the judgment that the input units were switched. For example, when the input unit was switched to the dial operation unit 33, the menu specific data for the "arc" is extracted from the GUI specific template DB 452 to generate a new GUI template based on the menu specific data. Further, the menu manager 420 extracts the previous user operational status data before the switch, which is stored in the GUI common template DB 451 (i.e., the data indicating the preceding user operational status before the update in S203) and appends the extracted user operational status data to the newly generated GUI template. The data for menu display generated as above is provided to the menu player 410. Thus, the menu player 410 can display the menu corresponding to the input unit while a display screen in which the latest status, indicating the menu item having been focused, is reflected can be displayed. It has been described that the menu manager 420 provides the newly generated GUI template with the user operational status being appended to the menu player 410; however, the menu manager 420 may provide the newly generated GUI template to the menu player 410 and thereafter provide the instruction to switch displays according to the user operational status to the menu player 410. Thus, with the user operational status data, the operability of the hierarchical menu is prevented from being detracted; rather, the menu can be displayed in a preferable format for the input unit, and the usability is improved.

In S205, after the GUI template is provided to the menu player 410, (alternatively, after the instruction to switch the displays is given,) the process proceeds to S206. In S206, it is judged as to whether the menu manager 420 (alternatively, the operating system of the terminal device) should be terminated. If the menu manager 420 should not be terminated (S206: NO), the process returns to S202. If it is judged that the menu manager 420 should be terminated (S206: YES), the process is terminated.

FIG. 14 is a diagram to illustrate the menu in the "list" format, which corresponds to the operation keys 32. Icons 501, 502, 503 in an uppermost layer are displayed, and application icons 511, 512, 513 in a layer lower down from the icon 501 are displayed. Further, the application icons 511, 512, 513 are respectively provided with application information 521, 522, 523 in a lowermost layer. The hierarchical structure of the menu items are based on the menu ID in the GUI common template DB 451, and the display positions of the menu items are based on the menu specific data in the "list" format in the GUI specific template 452.

In the example shown in FIG. 14, each of the icons 501, 502, 503 indicates a category of a plurality of the application programs, which are in the lower layer. The icons 501, 502, and 503 are respectively provided with graphics indicating "communication," "control," and "security." Further, the application icons 511, 512, and 513, are respectively associated with the mailer, the media player application, and the browser. Graphic images to notify the application programs, which are respectively associated with the menu items, are displayed in the display positions for the application icons 511, 512, 513. The application information 521, 522, 523 are reserved to be areas in which various information concerning the application programs associated with the menu items in the upper layer is displayed. The application information 521, 522, and 523 respectively represent information of a newly arriving mail, information concerning a background music currently being played or having been played at the latest, and information concerning a web page currently being displayed or having been displayed. The information is obtained by the application programs and administrated by the menu manager 420.

In the example shown in FIG. 14, the icon 501 in the uppermost layer is focused, and the application icons 511, 512, 513 in the lower layer and the application information 521, 522, 523 in the lowermost layer are displayed. The user is to operate through the operation keys 32. In this state, for example, the user can press down "downward" of the direction key 32a once so that the icon 502 is focused on and "rightward" once so that the application icon 511 is focused on. Further, when the operation keys 32 include a key to instruct "enter," and when the "enter" is operated with the application icon 511 being focused, the mailer which is the application program being associated with the application icon 511 can be activated.

FIG. 15 is a diagram to illustrate a menu in the "arc" format, which corresponds to the dial operation unit 33. Icons 601, 602, 603 in an uppermost layer arranged in an arc are displayed, and application icons 611, 612, 613 in a layer lower down from the icon 601 are displayed. Further, the application icons 611, 612, 613 are respectively provided with application information 621, 622, 623 in a lowermost layer. The hierarchical structure of the menu items are based on the menu ID in the GUI common template DB 451, similarly to the example shown in FIG. 14. The display positions and behaviors of the menu items are based on the menu specific data in the "arc" format in the GUI specific template 452.

In the example shown in FIG. 15, contents to be displayed of the icons 601, 602, 603 are identical to those of the icons 501, 502, 503 shown in FIG. 14; therefore, explanation of those is omitted. Further, contents to be displayed and the application programs being associated with of the application icons 611, 612, 613 are identical to those of the application icons 511, 512, 513 shown in FIG. 14; therefore, explanation of those is omitted. Furthermore, contents to be displayed of application information 621, 622, 623 is identical to that of the application information 621, 622, 623 shown in FIG. 14; therefore, explanation of those is omitted.

In the example shown in FIG. 15, the icon 601 in the uppermost layer is displayed in an approximate center of the arc and focused on. Further, the application icons 611, 612, 613 in the lower layer and the application information 621, 622, 623 in the lowermost layer are displayed. In this state, the user is to rotate the dial operation unit 33 in a clockwise direction for a predetermined amount so that the icon 602 is moved to the center of the arc to be focused on. Simultaneously with the icon 602 being focused, the menu items in the lower layer of the icon 602 are displayed on the window. In the state shown in FIG. 15, when the dial operation unit 33 is pressed toward a rotation axis of the dial, the focus is moved to the lower layer down from the icon 601. That is, in the present example, the application icon 611 is focused on. Thereafter, as the dial operation unit 33 is rotated in the clockwise direction for a predetermined amount, the application icon 612 is focused on. Further, when the dial operation unit 33 is pressed toward the rotation axis of the dial, the mailer which is the application program being associated with the application icon 611 can be activated.

FIG. 16 is a diagram to illustrate a menu in the "tab" format, which corresponds to the touch panel 11. Icons 701, 702, 703 in an uppermost layer are displayed, and application icons 711, 712, 713 in a layer lower down from the icon 701 are displayed. Further, the application icons 711, 712, 713 are respectively provided with application information 721, 722, 723 in a lowermost layer. The hierarchical structure of the menu items are based on the menu ID in the GUI common template DB 451, similarly to the example shown in FIG. 14. The display positions and behaviors on the display screen of the menu items are based on the menu specific data in the "tab" format in the GUI specific template 452.

In the example shown in FIG. 17, contents to be displayed of the icons 701, 702, 703 are identical to those of the icons 501, 304303 shown in FIG. 14; therefore, explanation of those is omitted. Further, contents to be displayed and the application programs being associated with of the application icons 711, 712, 713 are identical to those of the application icons 511, 512, 513 shown in FIG. 14; therefore, explanation of those is omitted. Furthermore, contents to be displayed of application information 721, 722, 723 is identical to that of the application information 621, 622, 623 shown in FIG. 14; therefore, explanation of those is omitted. It is noted in the example shown in FIG. 16 that the application icon 711 and application information 721 is included in a tab 731, the application icon 71 and application information 722 is included in a tab 732, and the application icon 713 and application information 723 is included in a tab 733. Areas indicated by the icon 701, 702, 703, and the tabs 731, 732, 733 are areas capable of being operated by the user through the touch panel 31.

In the example shown in FIG. 16, the icon 701 in the uppermost layer is selected and focused on. Further, the application icons 711, 712, 713 in the lower layer and the application information 721, 722, 723 in the lowermost layer are displayed. The user is to operate through the touch panel 31. In this state, the user is allowed to select any of the icons 701, 702, 703, and the tabs 731, 732, 733. In other words, the user can touch the areas indicated by the icons and the tabs. When the user selects one of the icons 702 and 703, the selected one is focused on, and simultaneously, the application icon in the layer and the application information in the lowermost layer are displayed on the display screen. In the state shown in FIG. 16, when one of the tabs 731, 732, 733 is selected, the application program being associated with the application icon included in the selected tab is activated. For example, when the tab 731 is selected, the mailer is activated.

Transition of the display screens when the input units are switched is described hereinbelow. When the menu in the "list" format shown in FIG. 14 is displayed, (i.e., the icon 501 is focused on,) and when an operation is given through the dial operation unit 33 (S202 in FIG. 13), the menu manager 420 detects the switch of the input units (S204), a new GUI template is generated (S205), and the menu such as that shown in FIG. 15 is displayed on the display screen by the menu player 410. Similarly, when the menu in the "list" format as shown in FIG. 14 is displayed, and when an operation through the touch panel 31 on the display screen is given, the menu as shown in FIG. 16 is displayed. The menus shown in FIGS. 14-16 are interchangeable. Even when the menus are changed by the switch of the input units, the focused position (i.e., the menu item being focused on) remains unchanged. Therefore, even when the user changes the input units, the menu is not brought back in the initial configuration, and the focused position can be maintained unchanged, which is advantageous in the operability.

In addition, transition of the display screen when the input units are switched, according to another embodiment of the present invention, will be described. For example, it is assumed that the dial operation unit 33 is pressed toward the rotation axis of the dial in the menu in the "list" format. A menu in the "arc" format to follow the operation is shown in FIG. 17.

In the menu shown in FIG. 17, the application icon 611 is focused on. It should be noted that, in the state shown in FIG. 14, the "rightward" of the direction key 32a is pressed, for example, the application icon 511 in the lower layer down from the icon 501 being focused on now becomes focused. Alternatively, in FIG. 15, when the dial operation unit 33 is pressed toward the rotation axis of the dial, the application icon 611 in the lower layer down from the icon 601 being focused on now becomes focused. In the embodiment according to the present invention, when an operation to shift down to the lower layer through the dial operation unit 33 is given in the menu in the "list" format as shown in FIG. 14, the operation is accepted. Such an operation can be achieved when the menu manager 420 extracts the user operational status data after the switch of the input units (i.e., the data updated in S203) from the GUI common template DB 451.

In the present invention, the menus are switchable according to the input units. In this regard, the input units may include an input unit to recognize a user by fingerprint authentication and the like. In such a case, when a user to operate the input unit is replaced with another user, the menu manager 420 can detect the replacement and generate a GUI template so that the menus can be differed. For example, the menu specific data can be prepared for each user in the GUI specific template DB 452 so that a GUI template for a current user can be generated when the menu manager 420 judges based on the fingerprint authorization that the input is made by a user who is different from the previous user and identifies the user. Further, usage status for each of the users is stored as the user operational status in the GUI common template DB 451 to be administrated. Thus, the menu manager can generate the GUI template for the user making the input and display the menu, which reflects the previous operational status for the user, through the menu player 410 on the display screen. This function can be notably advantageous when the terminal device 30 is shared to be used by a plurality of users.

In an aspect of a plurality of embodiments, including the first embodiment, of the present invention, the display unit is further provided with items, each of which represents an upper layer being associated with at least one of the application programs, the menu window is a menu screen configured in a hierarchy, and the display unit displays, when any of the items respectively representing the upper layers is selected through the selection unit, the items respectively representing the application programs being associated with the item representing the upper layer along with the status information on the display screen.

Alternatively, the display unit is further provided with items, each of which represents an upper layer being associated with at least one of the application programs, the menu window is a menu screen configured in a hierarchy, and the display unit displays, when any of the items respectively representing the upper layers is selected through the selection step, the items respectively representing the application programs being associated with the item representing the upper layer along with the status information on the display screen.

The configuration being combined with the hierarchical structure as described above enables the user to make a selection of menus more easily.

Optionally, the display unit associates lower layers of the items respectively representing the application programs with items representing the status information concerning the application programs.

The hierarchical structure of the status information as described above enables the plurality of pieces of status information to be included in the menus easily.

Optionally, the display unit displays objects on the display screen based on a template, which defines a hierarchical structure including the items respectively representing the upper layers, the items respectively representing the application programs, and items respectively representing the status information, and manners of displaying and operational behaviors.

The usage of the template as described above enables menus having uniformity in operations and displays to be easily designed.

Optionally, the template defines the manners of displaying and operational behaviors for the items respectively representing the upper layers, which include contents to be displayed, positions to be displayed, sizes to be displayed, and behaviors based on user's operations.

Optionally, the template associates the items respectively representing the application programs with the application programs and defines the manners of displaying and operational behaviors for the items respectively representing the application programs, which include contents to be displayed, positions to be displayed, sizes to be displayed, and behaviors based on user's operations.

Optionally, the template defines the manners of displaying and operational behaviors for the items respectively representing the status information, which include contents to be displayed, positions to be displayed, sizes to be displayed, and behaviors based on user's operations.

The usage of the template enables the menus with uniformity and better operability can be easily created without being troubled by individually designing layouts of the menus.

Optionally, the behaviors based on user's operations include activation of the application programs.

With the above configuration, usability in activating an application program can be improved.

Optionally, the status information is provided to the container unit at predetermined timing by the application programs.

Alternatively or additionally, the status information is obtained from the application programs at predetermined timing to be contained in the container unit.

With the above configuration, the operational status of the application programs can be displayed in the menus.

Optionally, the predetermined timing refers to, when the application program is inactive, a time point in which the application program was previously terminated.

With the above configuration, the latest operational status of the application programs can be displayed in the menus even when the application programs are not active.

Alternatively or additionally, the predetermined timing refers to periodic occurrence when the application program is active.

With the above configuration, relatively new operational status of the application programs can be displayed at all times. Further, even when the operation system hangs up and is restarted, the relatively new operational status of the application programs can be displayed.

In an aspect of a plurality of embodiments, including the second embodiment, of the present invention, the variant menus include a plurality of menu items as options to be selected, the menu specific data defines at least with which input unit each of data concerning contents of the plurality of menu items and the variant menus is associated, and the menu common data defines at least a hierarchical structure of the plurality of menu items.

With the above configuration, the menus including the plurality of menu items, each of which is associated with an input unit, can be easily created.

Optionally, the information concerning operational status indicates a previous menu item and a layer in the hierarchical structure of the previous menu item, which had been selected in the menu through the input unit having been used prior to the switching, and the information concerning the operational status, in which a menu item and a layer in the hierarchical structure corresponding to the previous menu item and the hierarchical structure of the previous menu item which had been selected prior to the switching are designated, is reflected in the terminal device.

With the above configuration, the user is not required to, for example, repeat operations starting from an initial screen each time when the input units are switched, and the previous operations can be continued. Therefore, operability can be notably improved.

Optionally, the information concerning operational status indicates a previous menu item and a layer in the hierarchical structure of the previous menu item, which had been selected in the menu through the input unit having been used prior to the switching, and contents of operations provided through the input unit being used when it is judged that the input units are switched, and the contents of operations are added to the information concerning the operational status, in which a menu item and a layer in the hierarchical structure corresponding to the previous menu item and the hierarchical structure of the previous menu item which had been selected prior to the switching are designated, to be reflected in the terminal device.

With the above configuration, switching of the input units can be equated with a selecting operation so that user's inputting operations can be omitted and operability can be improved.

Optionally, the contents of the plurality of menu items included in the menu specific data contains at least data to define layout of the plurality of menu items on the screen.

With the above configuration, the screen display can be changed depending on the input units to be operated so that the user can easily recognize the input unit being used. Further, menus which are arranged in correspondence with positions, shapes, and operations of the input units to be used can be provided so that more intuitive user interface can be achieved. Therefore, operability of the user can be improved.

Optionally, the contents of the plurality of menu item included in the menu specific data contains at least data to define graphic data of the plurality of menu items.

Optionally, the contents of the plurality of menu item included in the menu specific data contains at least data to define behaviors of the menu items to be performed in response to user's operations.

With the above configuration, menu screens in which displays and/or operations are unified on basis of an input unit and visibility is improved can be easily designed.

The information concerning operational status is contained on a user basis.

With the above configuration, when the device is shared by a plurality of users, each user can configure the device in a preferable operational environment and continuously use the device in the environment; therefore, usability is improved.

The terminal device according to any of claims 1 through 8, wherein the menu specific data is configurable on a user basis.

With the above configuration, when the device is shared by a plurality of users, each user can configure the device in a preferable operational environment and continuously use the device in the environment; therefore, usability is further improved.

It should be noted that the above embodiments which have been described above in order to describe the present invention are provided merely as examples, and the scope of the invention is not limited thereby. Although the above-described embodiments include various features, these features are not necessarily required in all of the embodiments. Some embodiments of the present invention merely include some of the above features. Further, the embodiments of the present invention having various combination of the above-described features can be achieved easily by a person skilled in the art. Furthermore, the above-mentioned numerical values, materials, and the like are examples provided in order to facilitate understanding of the present invention, but not provided in order to limit the scope of the present invention. The scope of the present invention will solely be set forth by the appended claims.

What is claimed is:

1. A terminal device, comprising:
a display screen;
a display unit having a function to display a menu window on the display screen,
wherein the menu window includes an upper layer of items, each item representing an application program grouping, and
wherein each application program grouping contains one or more application programs;
a selection unit to prompt a user to select any of the items in the menu window being displayed on the display screen; and
a container unit to contain status information concerning an application program of the one or more application programs,
wherein the status information of the application program represents a datum executable by the application program,
wherein the display unit displays, when any of the items respectively representing the upper layers is selected through the selection unit, an application program symbol associated with each one of the application programs contained in the application program grouping represented by the selected item along with the status information concerning each application program having an executed datum in the container unit on the display screen,
wherein the status information displayed by the display unit represents the latest datum executed by the application program when the application program was last active,
wherein when the application program is last active refers to, when the application program is inactive, a time point in which the application program was one of: previously terminated, minimized from the display, and activated by a periodic occurrence.

2. The terminal device according to claim 1,
wherein the display unit is configured to display objects on the display screen based on a template, wherein the template defines:
a hierarchical structure including the first plurality of items representing the upper layers, a second plurality of items representing the one or more application programs, and a third plurality of items representing the status information.

3. The terminal device according to claim 2,
wherein the template defines the manners of displaying and operational behaviors for the first plurality of items respectively representing the upper layers, which include contents to be displayed, positions to be displayed, sizes to be displayed, and behaviors based on user's operations.

4. The terminal device according to claim 2,
wherein the template associates the items respectively representing the application program grouping with the respective one or more application programs and defines the manners of displaying and operational behaviors for the second plurality of items respectively representing the one or more application programs, which include contents to be displayed, positions to be displayed, sizes to be displayed, and behaviors based on user's operations.

5. The terminal device according to claim 4,
wherein the behaviors based on user's operations include activation of the one or more application programs.

6. The terminal device according to claim 2,
wherein the template defines the manners of displaying and operational behaviors for the third plurality of items representing the status information, which include contents to be displayed, positions to be displayed, sizes to be displayed, and behaviors based on user's operations.

7. The terminal device according to claim 1,
wherein the application program of the one or more application programs is a media player application program, and
wherein the status information is related to a recorded track, and the setting pertains to one of an artist name, song name, track number, album name, associated with the recorded track.

8. The terminal device according to claim 1,
wherein the application program of the one or more application programs is a browser application program, and
wherein the status information is related to a web page, and the setting is the URL of the last website visited.

* * * * *